March 5, 1935.  E. V. J. TOWER ET AL  1,993,125
CLUTCH TRANSMITTING ELEMENT
Filed Sept. 21, 1932   3 Sheets-Sheet 1

INVENTORS
Elmer V. J. Tower
Louis H. Harris
BY
Pennie Davis Marvin Edmonds
ATTORNEYS March 5, 1935.  E. V. J. TOWER ET AL  1,993,125
CLUTCH TRANSMITTING ELEMENT
Filed Sept. 21, 1932  3 Sheets-Sheet 2

INVENTORS
Elmer V. J. Tower
BY Louis H. Harris
Penne, Davis, Marvin Edmonds
ATTORNEYS Patented Mar. 5, 1935

1,993,125

UNITED STATES PATENT OFFICE 1,993,125

CLUTCH TRANSMITTING ELEMENT

Elmer V. J. Tower, North Syracuse, N. Y., and Louis H. Harris, Middletown, Conn., assignors, by mesne assignments, to The Russell Manufacturing Company, Middletown, Conn., a corporation of Connecticut Application September 21, 1932, Serial No. 634,110

28 Claims. (Cl. 192—68)

This invention relates to power transmitting elements of the flexible or shock-absorbing type constructed to dampen and absorb torsional vibration received from a source of power and thus prevent such vibration from being transmitted to a driven element. A transmitting element embodying the principles of the invention offers special advantages when used in a clutch of the type employed in motor cars driven by an internal combustion engine generating torsional vibration, and, accordingly, for purposes of explanation, an embodiment of the invention in the form of a clutch transmitting disc will be described in detail, although it is to be understood that the utility of the invention is not restricted to that particular application of its principles. The new transmitting element may be employed in clutches of different forms but I have illustrated and shall describe a clutch of the single disc type by way of example.

In clutches now commonly used in motor cars, the fly wheel of the motor is used as one part of the driving element and attached to the fly wheel is a master plate on which is mounted a presser plate which is urged toward the face of the fly wheel by heavy springs. Between the presser plate and fly wheel is the transmitting element splined to the transmission shaft, and this transmitting element carries friction mats which make contact with the presser plate and with the fly wheel. When the clutch is engaged, the presser plate forces the friction surface of the transmitting element into engagement with the fly wheel and thus connects the transmission shaft to the motor shaft.

As is well known, internal combustion engines in motor cars generate torsional vibration which in a particular motor may reach a maximum value during either low, high, or medium driving speeds, depending upon the motor design. When the motor is operating at these speeds the torsional vibration may be transmitted through the clutch to the transmission and propeller shaft and these parts then vibrate, causing pronounced rattles and clatters in the transmission due to intermittent loading and releasing of pressure on the gear teeth. Similarly, when the car is running under its own momentum with the clutch engaged but with the motor shut down, a condition which will be referred to as "coasting", torsional vibration is also developed, and it reaches a maximum which is usually at a motor speed different from that at which the maximum vibration occurs during driving.

In order to dampen and absorb torsional vibration thus generated, clutch transmitting elements are used in which there are flexible connections between the hub and the disc on which the friction mats are mounted, and heretofore, prior to the inventions of Tower in this field, these connections commonly took the form of blocks of rubber or coil springs interposed between the hub and the disc. These devices have not been particularly successful, because they either do not provide the amplitude of yield necessary to absorb and dampen completely the vibration generated or else the devices do not permit the variation or adjustment in operation which is necessary to obtain best results during both driving and coasting. For instance, in most motor vehicles, the speed at which the maximum vibration is generated during driving may be considerably higher or lower than the speed at which the vibration reaches its maximum during coasting. Accordingly, if the flexible connections are of such stiffness as not to come into play until the torque transmitted through them approximates that developed at the speed of motor operation for maximum vibration during driving, these connections will not yield and perform their dampening function when subjected to the torque transmitted at the speed at which maximum vibration occurs during coasting. The consequence is that if the connections are sufficiently flexible to function under both conditions, the probabilities are that the connections will be too yielding for driving purposes and the disc and hub of the element will have relative movement at lower torques than those corresponding to that at which maximum vibration occurs in the driving range and this results in an undesirable "windup" action. If, however, the connections are made sufficiently stiff so that they do not yield until subjected to a torque corresponding to that applied when maximum vibration occurs during driving, the connections will be too stiff to absorb vibration at the lower speeds corresponding to maximum vibration in the coasting range.

In the co-pending application of Tower, Serial No. 449,207, filed May 2, 1930, there is disclosed a transmitting element in which these difficulties are overcome and the element of that application includes flexible connections in the form of radial spring bundles mounted in the hub and having projecting portions which are received in recesses in the disc. The side walls of the recesses in the hub and the side walls of the recesses in the disc are formed with a curvature, depending upon the conditions of operation of the motor with which the disc is to be employed, and the curvature of the walls is such that the spring bundles may yield under different torques during driving and coasting and the element thus absorbs and dampens the vibrations without undesirable wind-up. In the construction illustrated in the Tower application mentioned, the disc is mounted between a flange on the hub and a companion flange and the recesses for the hub ends of the bundles are formed in part in both flanges. It will be apparent that the formation of the curved walls of the recesses requires considerable precision in manufacture and the machining of the recesses in the companion flange particularly requires skill and is somewhat expensive.

The present invention is accordingly directed to the provision of a clutch transmitting element which performs the desired function of dampening and absorbing torsional vibration and which can be produced at a relatively low cost and without expensive machining. The new element includes radial spring bundles so arranged as to provide an amplitude of yield in the element in excess of the maximum amplitude of the torsional vibration generated, and at the same time, the yielding of the connections occurs at torque loads fairly close to the loads corresponding to the maximum vibration both in the driving and coasting range. Accordingly, objectionable wind-up effects are eliminated in either direction and the element functions properly in both ranges.

The new element comprises the usual hub and disc mounted on the hub and carrying the friction mats, and the disc and hub are provided with recesses in which radial spring bundles are mounted in pairs, one end of each bundle being held tightly in the hub while its other end lies loosely in a recess in the disc with one face engaging a curved wall in the disc recess while its other face is free. In the hub recess, the ends of the bundles of each pair are separated by a projection, the opposite faces of which are curved through a part of their length, with the curved surfaces converging. During driving, the disc has a tendency to move relatively to the hub in one angular direction, for example, counter-clockwise, and this relative movement is resisted by one of the bundles which is engaged by the curved wall at the trailing side of the recess and has its other face in engagement with the trailing surface of the projection. The torque transmitted from the disc to the hub may cause this bundle to flex and, as the bundle bends, it contacts to an increasingly greater extent on one face with the curved wall of the recess and along the opposite face with the curved surface of the projection. During this operation, the second bundle is without flexure since the curved wall at the leading side of the recess tends to move away from the bundle and the latter is thus subjected to no flexing stress.

In coasting, the second spring bundle is flexed in the same way that the first bundle is flexed during driving and, since the two bundles thus come alternately into operation, one during driving and the other during coasting, each bundle and its associated parts may be constructed in exact accordance with the conditions which it is to take care of in operation and it is not necessary as in prior discs to adopt a compromise construction which does not give full satisfaction in either range.

In one form of embodiment of the invention, the disc is made up of a plurality of independent spokes having enlarged hub ends which are placed in contact and held in a plane by means of center washers which are connected to the spokes and lie between a flange on the hub and a companion flange. The spokes and washers are stamped from sheet metal and have recesses opening at the inner edges of the center washers and extending into the ends of the spokes. These recesses have walls formed with the desired curvature during the stamping operation. The hub flange and the companion flange are also formed with recesses corresponding in number to those in the disc and the recesses in the flanges have straight walls parallel to radii. In the bottom of each hub recess is an inverted T-shaped member, the vertical leg of which constitutes a projection, the leg having opposite surfaces at its end which have the curved converging formation above mentioned. This member is formed by rolling a bar of metal to the desired section and cutting it into proper lengths, and by the use of the member, the necessary curvature in the walls of the hub recesses may be provided without expensive machining operations. In each of the recesses is mounted a pair of spring bundles extending radially and each bundle is gripped at its hub end between the straight walls formed in the hub flange and companion flange and the straight side of the projection. The outer end of each bundle extends into the disc recess with one face bearing against the curved wall thereof and the other face free.

In another form of embodiment of the invention, referred to as the straddle-mounted type, the disc is a one-piece metal stamping and it is provided with means, for example, one or more dished washers or rings, which extend to the surface of the hub and receive the hub flange between them. The flange is formed with recesses, each subdivided by a projection, in which the hub ends of pairs of bundles are received, and the outer ends of the bundles project through window openings in the rings which serve as the disc recesses, the walls of which bear against bundles. In the formation of this type of the new element, the rings with their window openings are formed by stamping and the hub with its projections may be made by a forging operation. This construction also involves no costly machining and for other reasons, which will be apparent from the detailed description to follow, it is somewhat less expensive than the spoke type.

For a better understanding of the invention, reference may be had to the acompanying drawings, in which.

Figures 1, 2, 3, 4:
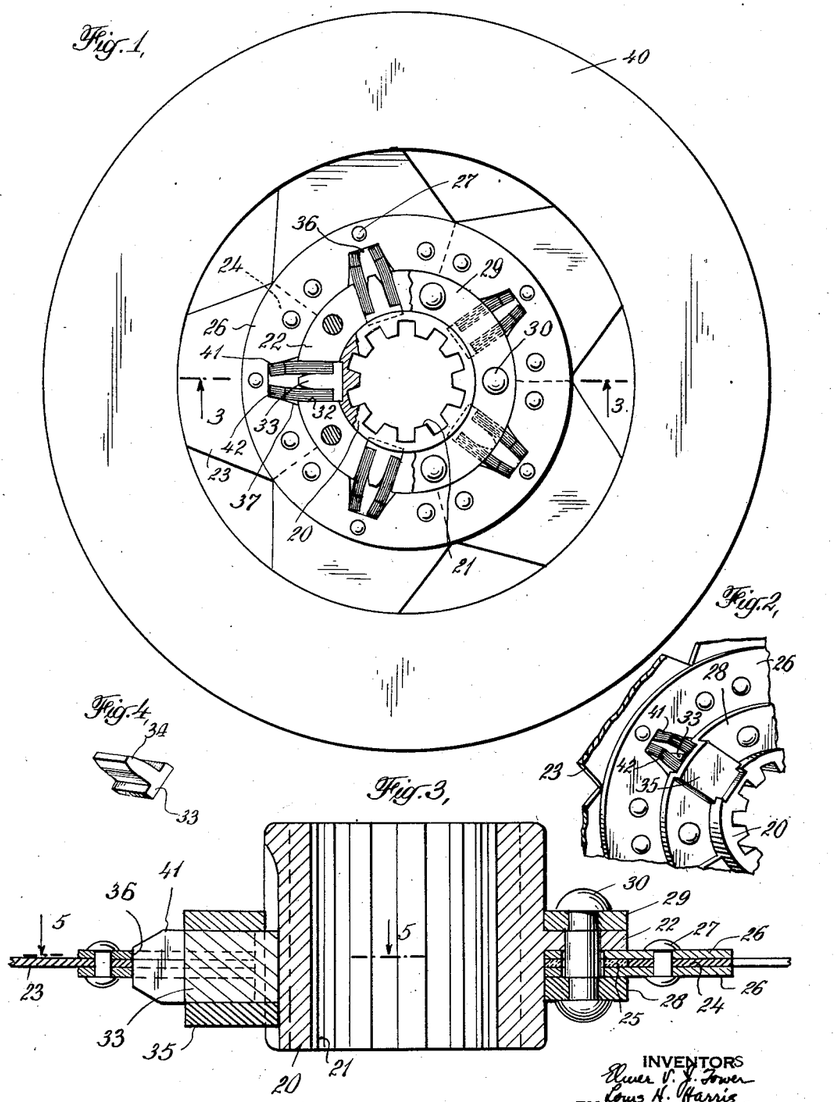
Fig. 1 is a plan view of one form of the new element, certain parts being broken away.
Fig. 2 is a perspective view of a portion of the complete element.
Fig. 3 is a sectional view on the line 3—3 of Fig. 1.
Fig. 4 is a perspective view of a part of the transmitting element.

Referring now to the drawings, the element is illustrated in Fig. 1 as comprising a hub 20 having integral splines 21 and formed with an integral circumferential flange 22 to which the disc of the element is attached. The disc may be made of a single piece of metal but in the construction shown, the disc consists of a plurality of spokes 23 which have enlarged hub ends 24 and lie with their hub ends in a plane with the lateral edges abutting. The spokes together define a central opening through the disc which is somewhat greater than the diameter of the hub and interposed between the hub ends of the spokes and the surface of the hub is a flat ring or washer 25 of heat insulating material.

Figure 5:
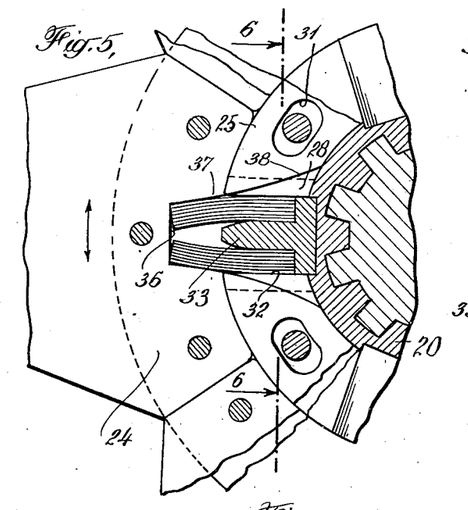
Fig. 5 is an enlarged sectional view on the line 5—5 of Fig. 3.
Figure 6:
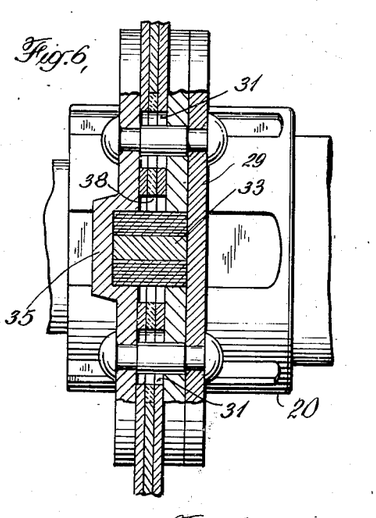
Fig. 6 is a sectional view on the line 6—6 of Fig. 5.

The hub ends of the spokes are held in a plane between a pair of center washers 26 which have an inner diameter not substantially greater than the outer diameter of the hub proper, and the washers are secured to the spokes by rivets 27, three rivets passing through each spoke in the construction illustrated. The washers lie on opposite sides of the insulating washer 25 and one washer lies in contact with one face of the hub flange 22. On the other side of the other washer is a companion flange 28 and there is a retaining washer 29 against the face of the hub flange opposite to that with which the first center washer contacts. The parts described are secured together by double end shoulder rivets or bolts 30, which pass through reduced diameter holes in the retaining washers 29 and the companion flange 28, these rivets having a clearance fit at their larger diameter through the hub flange 22, center washer 26, and insulating washer 25. The rivets or bolts have reduced opposite ends providing shoulders which space companion flange 28 and retaining washer 29 apart, so as to permit the limited relative angular movement of the center washers 26 and the insulating material 25 which is provided by the elongated holes therein through which the rivets or bolts 30 loosely pass, as is illustrated at 31 (Fig. 5). The rivets 30 thus secure the disc and its associated parts to the hub but permit the disc and hub to have a limited degree of relative angular movement determined by the degree of yield of the dampening means.

The hub flange has a recess 32 opposite each of the spokes 23 and seated in this recess is an inverted T-shaped member 33. The side walls of the recess 32 are parallel to a radius of the hub and the side walls of the vertical leg of the T are also parallel for a portion of their length. Beyond the parallel portions, the walls are curved and converge toward one another as indicated at 34. The T-shaped element 33 is seated in a channel cut in the surface of the hub and the recess in the flange extends completely across the latter. The T-shaped element extends through the recess in the hub flange and into a recess in the companion flange defined by an offset portion 35, and having side walls which are parallel from top to bottom. The member is held in place in its channel in contact with the side of the companion flange by the retainer ring 29 and assists the double end shoulder studs 30 in properly spacing the companion flange on the hub 20, allowing free action of the disc assembly through the dampening means provided.

The hub end of each spoke is formed with a recess 36, the side walls 37 of which are curved and divergent and the heat insulating washer 25 has openings cut in it, these openings having walls 38 which constitute continuations of the curved walls 37 of the recess in the spoke. Similarly, the center washers 26 have portions cut away to conform to the curvature of the edges 38 of the opening through the heat insulating washer and to the curvature of the walls 37 of the recesses in the spokes. These curved surfaces in combination with those provided on the opposite sides of the separator element 33 control the amount of relative movement possible between the complete hub assembly composed of the parts 20, 28, 29, 30, and 33 and the complete disc assembly composed of parts 23, 25, 26, 27, and 40.

Mounted in each pair of recesses in the hub and companion flanges is a pair of spring bundles 39, each bundle being made up of a number of leaves. The hub end of each bundle is gripped tightly between the straight portion of the vertical leg of element 33 and the straight side walls of the opening in the hub and the companion flanges, and the outer end of each bundle enters the disc recess formed in the spokes and center washers. The outer ends of the bundles are not secured in the disc recess but the outer face of each of these bundles is in contact with a curved wall of the recess.

Friction mats 40 are secured to the outer ends of the spokes 23 in any suitable way and when a clutch containing the element is engaged, its presser plate bears against the face of one mat and forces the other mat into contact with the working surface of the fly wheel. During driving, torque is transmitted from the outer ends of the spokes to the hub and the torque tends to cause the disc and hub to have a relative angular movement. Assuming that the driving torque is applied in a counter-clockwise direction, it will be apparent that it tends to move the disc in such manner that the trailing side of each disc recess bears against one spring bundle of a pair, and as the torque is increased, this bundle begins to flex until it tends to assume the position illustrated in Fig. 7. Throughout this movement, the spring bundle 41 resists the driving torque and it is shown in the extreme condition to which it may be flexed under shock so that the surface opposing the curved wall of the disc recess lies in contact with that wall for a substantial distance while the opposite surface of the bundle has been brought into substantially complete contact with one side of the inverted T-member 33, including both the straight and curved portions of that side wall.

The driving bundle 41 is made of a plurality of leaves of such number and stiffness that only the desired flexure of the bundle occurs under normal conditions of driving, but as the torque applied approaches that at which maximum torsional vibration is generated, the yield is increased and, functioning with the overlapping curved surfaces provided in the hub and disc assembly recesses, provides a variably resisted yield range in excess of the greatest amplitude of torsional vibration developed at the critical speeds of the motor. Accordingly, the increased flexure of the spring packs provides a yield range between the disc assembly and the hub in excess of the greatest amplitude of torsional vibration possible in the motor crank shaft and the packs thus serve to maintain the hub splines under tension with their shaft in the direction of normal rotation at all times. This prevents intermediate release of pressure at the gear teeth, which is the ultimate cause of all transmission rattles.

In driving, the second bundle 42 of each pair transmits no torque, and as soon as the relative movement of the disc and hub occurs as above described, the leading curved wall of the disc recess moves away from the face of the second bundle and no force is applied to the bundle tending to flex it. During coasting, the hub is driven by the rotation of the transmission shaft and it tends to move angularly relative to the disc. The leading side of the projection in the hub recess formed by the member 33 now bears against the rear face of spring bundle 42, while the opposite face of the spring bundle is forced toward the curved wall of the disc recess. This spring bundle then begins to be flexed until under extreme conditions, it may assume the position illustrated in Fig. 8.

Figure 7:
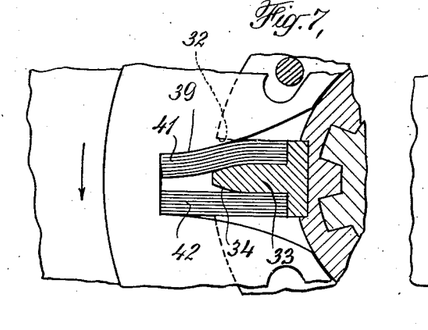
Figs. 7 and 8 are views similar to Fig. 6 showing the parts in different positions which they assume under different conditions of operation.
Figure 8:
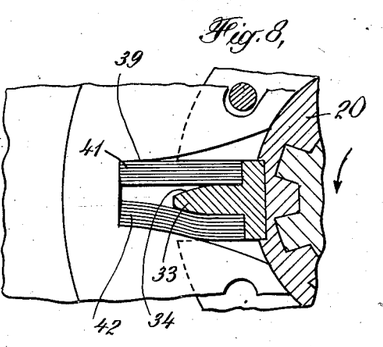

With the construction described, one spring bundle of each pair thus functions during driving and transmits the driving torque from the disc to the hub, as shown in Fig. 7, while the other spring bundle functions during coasting and transmits coasting torque from the hub to the disc, as shown in Fig. 8. The bundles are independent in construction and operation and provide means for substantially varying the spring loads independently of the yield range as governed by the curvature of the spring pockets. In most cases, the torque at which maximum torsional vibration occurs during the driving range is substantially greater than the torque during which maximum vibration occurs during coasting, and this condition may be taken care of by making the driving bundle of each pair with more leaves and of substantially stiffer leaves than the coasting bundle. Also, the curvature of the wall in the disc recess and the curvature of one side of the projection in the hub recess may be shaped to permit the desired amplitude of yield of the spring bundle under driving conditions while the other side of the projection and the opposite wall of the disc recess may have a different curvature appropriate for yield of the coasting bundle. Accordingly, in the new element, it is possible by the use of the two bundles of each pair operating alternatively, to provide a yielding connection which has the desired amplitude of yield and the necessary stiffness to prevent wind-up, and each bundle and its associated parts may be designed and constructed to give the desired performance under the two different conditions of operation.

In practice, we have found that for best results, the length of each spring bundle which is held tightly between the parallel surfaces in its hub recess should be at least equal to the thickness of the bundle and the depth of the hub recess should be such that the length of the bundle which contacts with the central projection when the bundle is in its extreme flexed condition should be at least as great as the sum of the thicknesses of the two bundles of a pair.

The recesses in the disc are defined by portions of each spoke and by portions of the two center washers and the insulating washer and these openings may be produced during the stamping of the spoke and center washers and pieces of insulating material may be readily cut to the desired shape. All these operations are simple and inexpensive. The recesses in the hub flange are formed with parallel walls by a simple milling operation or the hub can be produced as a forging, and the recesses in the companion flange which have straight walls can similarly be produced cheaply. The opposite faces of the vertical leg of the T-shaped member 33 are formed with definite curvatures and this can be accomplished during rolling of the bar from which the member is cut. Accordingly, in the new construction, the machining operations are reduced to a minimum and those which may be necessary are comparatively simple.

In the construction illustrated in Figs. 9 to 12, inclusive, the element comprises a hub 43 having a skeleton flange 44, and the disc 45 carrying friction mats 46 is stamped from a single piece of metal. The disc has an opening through it greater than the overall diameter of the hub and flange and at its inner edge dished rings 47 overlap the disc and are secured thereto by rivets 48. These rings extend inward on opposite sides of the hub flange to a point close to the surface of the hub. The hub flange is cut away at spaced points to leave abutment members 49 and 50 between which lies a projection 51. The opposed walls of the members 49 and 50 are parallel and the opposite surfaces of the projection 51 are parallel for a portion of their length, beyond which the surfaces curve toward each other as indicated at 52.

In the spaces between the members 49, 50 and the projection 51 are spring bundles 53, these bundles being tightly gripped in the hub. The spring bundles extend out beyond the ends of the members 49 and 50 and enter a recess 54 cut in the inner edge of the disc 45. Each of the rings 47 is also cut away to form a window opening 55 and the side walls 56 of this opening are curved. The outer face of each bundle of the pair engages the curved side walls of the window opening at one side thereof and the side wall of the recess in the disc and the bundles are held in place in the hub against lateral displacement by the portions of the rings 47 which overlap the hub and lie on opposite sides of the bundles.

An element of this construction functions in the same manner as that previously described and provides means for governing the yield range independently of the spring load used and viceversa. Also, the new element makes it possible to meet different requirements during driving and coasting since heavy springs may be used on the driving side and light springs on the coasting side or vice-versa. Relative movement of the hub and disc during driving results in flexing of one of the bundles of each pair, while the other bundle is flexed during coasting. The curvature of side walls of the openings in the dished rings and of the recesses cut in the disc is appropriate for the amplitude of yield desired and the curvature of the two sides of each projection 52 is selected for the same purpose. In this construction, the disc and hub are connected together for driving purposes only through the spring bundles but the disc cannot be dislodged from the hub because the dished rings 47 engage opposite sides of the abutment members 49, 50 and the projection 52.

Figure 9:
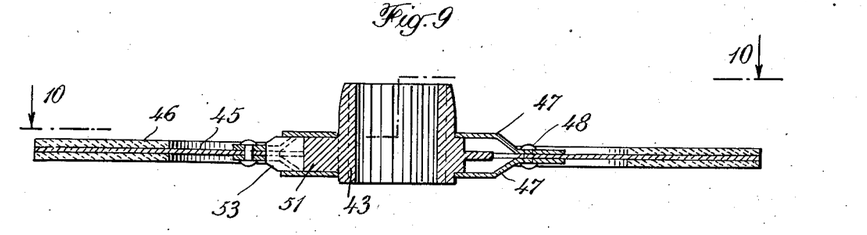
Fig. 9 is a modified form and is a sectional view on the line 9—9 of Fig. 10.
Figure 10:
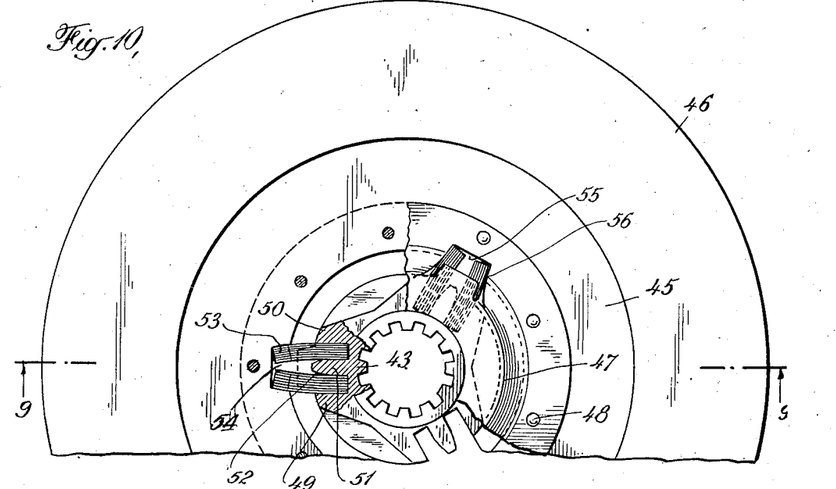
Fig. 10 is a sectional view on the line 10—10 of Fig. 9.
Figure 11:
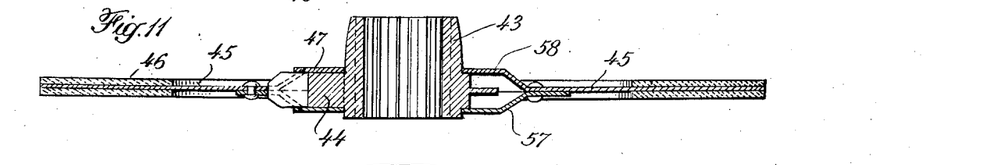
Fig. 11 is a sectional view on the line 11—11 of Fig. 12.
Figure 12:
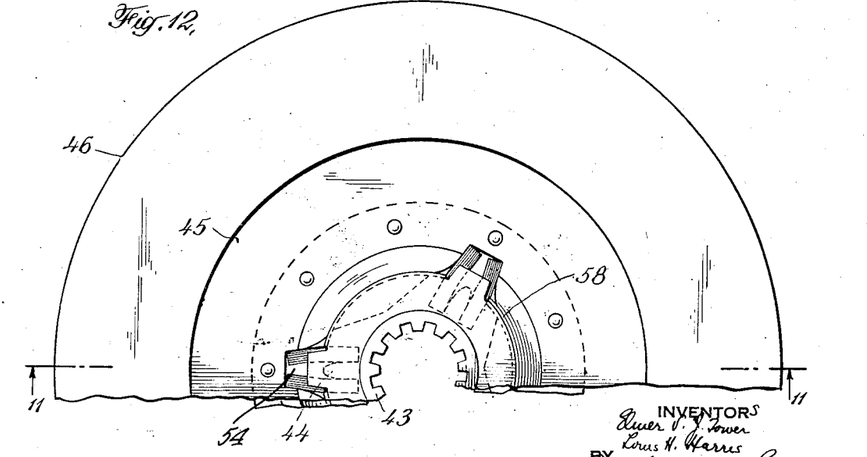
Fig. 12 is a fragmentary face view of another modified form of the transmitting element.

In the construction illustrated in Fig. 9, two dished rings 47 are secured to the disc 45 and straddle the projecting portions which form the skeleton hub flange. The same results may be obtained with less parts by the construction shown in Fig. 11 in which a single ring 57 is used and the disc 45 has a central opening not substantially greater than the diameter of the hub proper, the disc having a portion 58 along the opening which is offset and performs the function of one of the dished rings in the Fig. 9 construction.

In all the constructions described, each spring bundle is securely mounted in the hub while the outer end which enters the recess or opening in the disc is in contact only with a curved wall of the recess or opening. With this arrangement, the spring bundles are securely mounted and the mounting engages each spring bundle throughout the entire width of its face. With the divided pack construction, it is unnecessary to mount the spring bundles with their outer ends fast in the disc recesses because the stresses are substantially less at the outer ends of the spring packs than at the hub end by reason of the increased leverage afforded by the outer ends of the packs. The outer ends of the packs are adapted to have a V-shaped contact with the disc and this is entirely ample to provide proper distribution of the load over the entire outer section of the exposed end of each pack without the use of additional parts, all of which would add weight to the assembly and thus reduce the advantage of the lighter construction now employed.

What we claim:

1. A transmitting element which comprises a hub, a disc mounted on the hub and carrying friction material, and means for connecting the disc and hub together while permitting them to have relative angular movement, said means comprising bundles of leaf springs, each bundle having a portion secured fast in the hub and another portion received in a recess in the disc, the bundles being arranged in pairs with the bundles of each pair having portions in the same disc recess and an intermediate member having its opposite faces provided with surfaces adapted to clamp the inner ends of the springs and adapted to contact with the spring bundles under flexure at their outer ends.

2. A transmitting element which comprises a hub, a disc mounted on the hub and carrying friction material, and means for connecting the disc and hub together while permitting them to have relative angular movement, said means comprising bundles of leaf springs, each bundle having a portion secured fast in the hub and another portion received in a recess in the disc, said recess having walls flaring toward the hub and the bundles being arranged in pairs with the bundles of each pair having portions in the same disc recess and an intermediate member having its opposite faces provided with surfaces adapted to clamp the inner ends of the springs and adapted to contact with the spring bundles under flexure at their outer ends and one face of each bundle engaging one of said flaring walls, while the other face of said bundle is out of contact with said disc.

3. A transmitting element which comprises a hub, a disc mounted on the hub and carrying friction material, and means for connecting the disc and hub together while permitting them to have relative angular movement, said means comprising bundles of leaf springs, each bundle having a portion secured fast in the hub and another portion received in a recess in the disc, the bundles being arranged in pairs with the bundles of each pair having portions in the same disc recess and the portions of the bundles of said pair secured to the hub being maintained in spaced relation.

4. A transmitting element which comprises a hub, a disc mounted on the hub and carrying friction material, and means for connecting the disc and hub together while permitting them to have relative angular movement, said means comprising bundles of leaf springs, each bundle being mounted with one end fast in a recess in the hub and the other end entering a recess in the disc, the bundles being arranged in pairs with the ends of each pair in the same disc recess and an intermediate member having its opposite faces provided with surfaces adapted to clamp the inner ends of the springs and adapted to contact with the spring bundles under flexure at their outer ends.

5. A transmitting element which comprises a hub, a disc mounted on the hub and carrying friction material, and means for connecting the disc and hub together while permitting them to have relative angular movement, said means comprising bundles of leaf springs, each bundle being mounted with one end fast in a recess in the hub and its other end entering a recess in the disc, the bundles being arranged in pairs with one end of both bundles of a pair in the same disc recess and the other end of both bundles of a pair in the same hub recess, and a projection in each hub recess separating the ends of the bundles therein.

6. A transmitting element which comprises a hub, a disc mounted on the hub and carrying friction material, and means for connecting the disc and hub together while permitting them to have relative angular movement, said means comprising bundles of leaf springs, each bundle being mounted with one end fast in a recess in the hub and its other end entering a recess in the disc, the bundles being arranged in pairs with one end of both bundles of a pair in the same disc recess and the other end of both bundles of a pair in the same hub recess, and a projection in each hub recess separating the ends of the bundles therein and cooperating with the walls of said recess to secure the bundles fast in said recess.

7. A transmitting element which comprises a hub, a disc mounted on the hub and carrying friction material, and means for connecting the disc and hub together while permitting them to have relative angular movement, said means comprising bundles of leaf springs, each bundle being mounted with one end fast in a recess in the hub and its other end entering a recess in the disc, the bundles being arranged in pairs with one end of both bundles of a pair in the same disc recess and the other end of both bundles of a pair in the same hub recess, and a projection in each hub recess separating the ends of the bundles therein, said projection having curved outwardly converging surfaces facing said bundles.

8. A transmitting element which comprises a hub, a disc mounted on the hub and carrying friction material, and means for connecting the disc and hub together while permiting them to have relative angular movement, said means comprising pairs of bundles of leaf springs disposed circumferentially about said hub, each bundle having one end held fast in a recess in the hub and its other end entering a recess in the disc, the ends of both bundles of a pair being received in the same disc recess with each bundle having a face engaging one wall of said recess, the other ends of said bundles entering the same recess in the hub, and a projection in said hub recess separating said bundles, said projection having opposite faces parallel for a portion of their length and curving and converging at the free end of said projection.

9. A transmitting element which comprises a hub having a circumferential flange provided with angularly spaced recesses, a disc structure carrying friction material and having an opening through which said hub extends, the edge of said opening being formed with recesses and said opening being of less diameter than said flange, a companion flange on said hub having recesses corresponding in number and position to recesses in the hub, and pairs of spring bundles, the bundles of each pair having portions entering the same recesses in the flanges and other portions entering the same recess in the disc structure.

10. A transmitting element which comprises a hub having a circumferential flange provided with angularly spaced recesses, a disc structure carrying friction material and having an opening through which said hub extends, the edge of said opening being formed with recesses and said opening being of less diameter than said flange, a companion flange on said hub having recesses corresponding in number and position to recesses in the hub, pairs of spring bundles, the bundles of each pair having portions entering the same recesses in the flanges and other portions entering the same recess in the disc structure, and a projection in each recess in the flanges separating the portions of the two bundles therein and causing said bundles to be tightly held therein.

11. A transmitting element which comprises a hub having a circumferential flange provided with angularly spaced recesses, a disc structure carrying friction material and having an opening through which said hub extends, the edge of said opening being formed with recesses and said opening being of less diameter than said flange, a companion flange on said hub having recesses corresponding in number and position to recesses in the hub, pairs of spring bundles, the bundles of each pair having portions entering the same recesses in the flanges and other portions entering the same recess in the disc structure, and a member removably mounted in each hub flange recess and extending into the associated companion flange recess, said member having a projection separating the portions of the two bundles lying in the flange recesses.

12. A transmitting element which comprises a hub having a circumferential flange provided with angularly spaced recesses, a disc structure carrying friction material and having an opening through which said hub extends, the edge of said opening being formed with recesses and said opening being of less diameter than said flange, a companion flange on said hub having recesses corresponding in number and position to recesses in the hub, pairs of spring bundles, the bundles of each pair having portions entering the same recesses in the flanges and other portions entering the same recess in the disc structure, and a member of inverted T-shape removably mounted in the bottom of each hub flange recess and extending into the corresponding companion flange recess, the upright leg of said member separating the bundles in said recesses.

13. A transmitting element which comprises a hub having a circumferential flange provided with angularly spaced recesses, a disc structure carrying friction material and including a pair of central washers defining an opening of less diameter than said hub flange and through which said hub extends, a companion flange on said hub having recesses corresponding in number and position to those in said hub flange, said disc structure having recesses in the edge of the opening therein corresponding in number and position to those in the hub and companion flanges, means for securing the companion flange in place on the hub, and bundles of leaf springs arranged in pairs, the bundles of a pair having portions in the same flange recesses and other portions in the same recess in the disc structure.

14. A tranmitting element which comprises a hub having a circumferential flange provided with angularly spaced recesses, a disc structure carrying friction material and including a pair of central washers defining an opening of less diameter than said hub flange and through which said hub extends, a companion flange on said hub having recesses corresponding in number and position to those in said hub flange, said disc structure having recesses in the edge of the opening therein corresponding in number and position to those in the hub and companion flanges, bundles of leaf springs arranged in pairs, the bundles of each pair having portions received in the same disc recess, and other portions received in the same recesses in the hub and companion flanges, and means passing through said flanges and washers for holding said flanges together.

15. A transmitting element which comprises a hub having a circumferential flange provided with angularly spaced recesses, a disc structure carrying friction material and including a pair of central washers defining an opening of less diameter than said hub flange and through which said hub extends, a companion flange on said hub having recesses corresponding in number and position to those in said hub flange, said disc structure having recesses in the edge of the opening therein corresponding in number and position to those in the hub and companion flanges, bundles of leaf springs arranged in pairs, the bundles of each pair having portions received in the same disc recess, and other portions received in the same recesses in the hub and companion flanges, and rivets passing through said flanges and washers for holding said flanges together, said rivets permitting said disc structure and hub to move angularly relative to one another to a limited extent.

16. A transmitting element which comprises a hub having a circumferential flange provided with angularly spaced recesses, a disc structure carrying friction material and having an opening of less diameter than the hub flange and through which said hub extends, said structure having recesses in the edge of said opening having curved outwardly divergent walls, a companion flange on said hub having recesses in it corresponding in number and position to those in said hub flange, the recesses in said hub flange and companion flange having parallel walls, a pair of spring bundles mounted in the same recess in the hub flange and its associated recess in the companion flange, the bundles of said pair entering the same disc recess in which each bundle has one face engaging a curved wall of said recess, and a projection in each hub flange recess and its associated companion flange recess separating the bundles therein and cooperating with the parallel walls of said recesses for tightly holding said bundles, said projection having curved outwardly convergent walls facing said bundles.

17. A transmitting element which comprises a hub having spaced abutments disposed circumferentially, said abutments forming pairs of outwardly opening recesses, a spring bundle mounted fast in each recess and projecting outwardly beyond said recess, and a disc structure carrying friction material, said structure having an opening through which said hub extends, and portions lying on opposite sides of said abutments, said structure having angularly spaced openings, each opening receiving the ends of a pair of spring bundles.

18. A transmitting element which comprises a hub having spaced abutments disposed circumferentially, said abutments forming pairs of outwardly opening recesses, a spring bundle mounted fast in each recess and projecting outwardly beyond said recess, a disc structure carrying friction material, said structure including a pair of washers lying on opposite sides of said abutments, and openings in said structure, each opening receiving the ends of a pair of spring bundles.

19. A transmitting element which comprises a hub having spaced abutments disposed circumferentially, said abutments forming pairs of outwardly opening recesses, a spring bundle mounted fast in each recess and projecting outwardly beyond said recess, a disc structure carrying friction material and having parts lying on opposite sides of said abutments, said disc having openings in each of which the ends of a pair of said spring bundles projecting beyond said recesses are received, said openings having curved walls flaring toward said hub.

20. A transmitting element which comprises a hub having spaced abutments disposed circumferentially, said abutments forming pairs of outwardly opening recesses, a spring bundle mounted fast in each recess and projecting outwardly beyond said recess, and a disc structure carrying friction material and including a pair of central washers lying on opposite sides of said abutment members, said washers having openings therein for receiving the ends of a pair of spring bundles, each opening having curved walls flaring toward said hub and each spring bundle of a pair having one surface contacting with a curved wall.

21. A transmitting element which comprises a hub having a flange provided with recesses arranged in pairs, a disc having friction mats mounted thereon, said disc structure having an opening through which said hub extends, said opening being defined by a pair of washers overlapping said flange and lying on opposite sides thereof, and a spring bundle mounted fast in each recess and projecting outwardly beyond the flange, said washers having openings therein, and the ends of the bundles of each pair being received in the same openings in the washers.

22. A transmitting element which comprises a hub having a flange provided with recesses arranged in pairs, the adjacent walls of the recesses of each pair being curved and outwardly convergent, the remote walls of said recesses being parallel, a disc structure carrying friction material and mounted on said hub, the said structure having parts lying on opposite sides of said flange and extending to a point close to said hub, openings in said parts, said openings having curved walls diverging toward said hub, and pairs of spring bundles, each bundle having one end mounted fast in a recess in the hub flange, the other ends of the bundles of a pair being received in the same openings in said disc and each bundle having a face contacting with a curved wall of said opening.

23. A transmitting element which comprises a hub having pairs of spring bundles mounted securely therein and extending outwardly, said pairs being spaced circumferentially about the hub and the bundles of each pair engaging opposite sides of a projection, and a disc structure having a central opening through which said hub extends, said disc structure being provided with at least one centre washer at said opening and having recesses in the wall of said opening, said recesses being formed in part in said washer and each recess receiving the outer ends of a pair of spring bundles.

24. A transmitting element which comprises a hub having pairs of spring bundles mounted securely therein and extending outwardly, said pairs being spaced circumferentially about the hub and the bundles of each pair engaging opposite sides of a projection, a disc structure having a central opening through which said hub extends, said disc structure being provided with at least one centre washer at said opening and having recesses in the wall of said opening, said recesses being formed in part in said washer and each recess receiving the outer ends of a pair of spring bundles, and means connected to said disc structure for preventing its removal longitudinally of said hub.

25. A transmitting element which comprises a hub having outwardly projecting abutments forming recesses, a spring bundle for each recess having a portion received in the recess and another portion exposed, a disc structure having an opening through which the hub extends, said disc structure having a portion lying at one side of the abutments and a center washer extending toward the hub and lying on the other side of the abutments, and openings in the disc structure each of which receives the exposed portions of a pair of the spring bundles, said bundles constituting the sole connection securing the disc structure and hub together against relative angular movement.

26. A transmitting element which comprises a hub having outwardly projecting abutments forming recesses, a spring bundle for each recess having a portion received in the recess and another portion exposed, a disc structure having an opening through which the hub extends, said disc structure having a pair of center washers extending beyond the outer ends of said abutments toward the hub and lying on opposite sides of said abutments, and openings in said washers for receiving the exposed portions of said spring bundles, said bundles constituting the sole connection securing the disc structure and hub together against relative angular movement.

27. In a vibration dampener for automotive vehicles, the combination with the driving member having provisions for connection with the engine, and a driven member adapted to connect with the vehicle; of spring dampening means interposed between said driving and said driven members, said spring means comprising two independently operable leaf spring devices, the first spring device operative to control the vibration during engine driving torque while the second spring device remains inert, and the second spring device operative to control the coasting torque vibration while the first spring device remains inert, the two spring devices having located between them an intermediate member having its opposite faces provided with surfaces adapted to clamp the inner ends of the springs and adapted to contact with the spring bundles under flexure at their outer ends.

28. In a vibration dampener for automotive vehicles, the combination with the driving member having provisions for connection with the engine, and a driven member adapted to connect with the vehicle; of spring dampening means interposed between said driving and said driven members, said spring means comprising two independently operable leaf spring devices, the first spring device operative to control the vibration during engine driving torque while the second spring device remains inert, and the second spring device operative to control the coasting torque vibration while the first spring device remains inert; with provisions formed upon said driving and said driven members conforming to the varying extent of flexure of said dampening springs according to the contour of said provisions including an intermediate member between the two spring devices have located between them an intermediate member having its opposite faces provided with surfaces adapted to clamp the inner ends of the springs and adapted to contact with the spring bundles under flexure at their outer ends.

ELMER V. J. TOWER.
LOUIS H. HARRIS.